(12) United States Patent
Takahashi (10) Patent No.: US 10,081,208 B2
(45) Date of Patent: Sep. 25, 2018

(54) PRINTING DEVICE PROVIDED WITH WALLS FOR PREVENTING LEAKAGE OF ELECTROLYSIS LIQUID TO OUTSIDE OF WALLS

(71) Applicant: Brother Kogyo Kabushiki Kaisha, Nagoya-shi, Aichi-ken (JP)

(72) Inventor: Ryoya Takahashi, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/466,205

(22) Filed: Mar. 22, 2017

(65) Prior Publication Data

US 2017/0274687 A1 Sep. 28, 2017

(30) Foreign Application Priority Data

Mar. 25, 2016 (JP) ................................. 2016-061732

(51) Int. Cl.
   *B41J 29/13* (2006.01)
   *B41J 2/355* (2006.01)
   *B41J 3/407* (2006.01)

(52) U.S. Cl.
   CPC ............... *B41J 29/13* (2013.01); *B41J 2/355* (2013.01); *B41J 3/4075* (2013.01)

(58) Field of Classification Search
   CPC .......... B41J 29/13; B41J 2/355; B41J 3/4075
   See application file for complete search history.

(56) References Cited

U.S. PATENT DOCUMENTS

| 9,301,583 B2 * | 4/2016 | Kano ...................... A45C 11/00 |
| 2005/0007030 A1 * | 1/2005 | Ina .......................... G03B 15/05 |
|  |  | 315/241 P |
| 2014/0293521 A1 | 10/2014 | Kano et al. |

FOREIGN PATENT DOCUMENTS

| JP | 2002-216721 A | 8/2002 |
| JP | 2014-194874 A | 10/2014 |
| JP | 2015-189190 A | 11/2015 |
| JP | 2017076725 A * | 4/2017 |

OTHER PUBLICATIONS

May 15, 2018—(JP) Office Action—App 2016-061732, Eng Tran.

* cited by examiner

*Primary Examiner* — Henok Legesse
(74) *Attorney, Agent, or Firm* — Banner & Witcoff, Ltd.

(57) ABSTRACT

A printing device includes: a casing, a circuit board, an electrolytic capacitor, an explosion-proof valve, a first wall, a second wall, and a specific region. The electrolytic capacitor is connected to the circuit board. The electrolytic capacitor includes a sleeve portion containing electrolysis liquid therein and has an axis defining an axial direction. The sleeve portion has one end portion, another end portion, and a peripheral surface extending therebetween. The explosion-proof valve is provided at the one end portion. The first wall is disposed in the casing and faces the explosion-proof valve. The second wall extends from the first wall and faces at least a portion of the peripheral surface. The specific region is provided in the second wall and has one of a recessed portion and a protruding portion. The recessed portion is recessed away from the peripheral surface. The protruding portion protrudes toward the peripheral surface.

19 Claims, 11 Drawing Sheets

FIG. 11

PRINTING DEVICE PROVIDED WITH WALLS FOR PREVENTING LEAKAGE OF ELECTROLYSIS LIQUID TO OUTSIDE OF WALLS

CROSS REFERENCE TO RELATED APPLICATION

This application claims priority from Japanese Patent Application No. 2016-061732 filed Mar. 25, 2016. The entire content of the priority application is incorporated herein by reference.

TECHNICAL FIELD

The present disclosure relates to a printing device.

BACKGROUND

Conventionally, a printing device having a casing in which a tape cassette is accommodated is known in the art. For example, in a printing device disclosed in Japanese Patent Application Publication No. 2014-194874, a casing includes a main body, an upper cover, and a cassette cover. The main body accommodates therein the tape cassette. The upper cover is positioned above the main body, and the cassette cover is positioned below the main body. A circuit board is provided in the main body at a position adjacent to the upper cover. A control circuit for controlling operations of the printing device is mounted on the circuit hoard.

SUMMARY

Mounting an electrolytic capacitor on a circuit board is conceivable. The electrolytic capacitor is provided with an explosion-proof valve. If internal pressure of the electrolytic capacitor exceeds a predetermined level, the explosion-proof valve will open to release internal pressure. However, in the above-described printing device, scattering of electrolysis liquid that has been contained in the electrolytic capacitor may occur within the casing by the opening of the explosion-proof valve.

It is therefore an object of the disclosure to provide a printing device capable of restraining electrolysis liquid of an electrolytic capacitor from being scattered within a casing.

In order to attain the above and other objects, the disclosure provides a printing device including: a casing, a circuit board, an electrolytic capacitor, an explosion-proof valve, a first wall, a second wall, and a specific region. The circuit board is provided in the casing. The electrolytic capacitor is disposed in the casing and connected to the circuit board. The electrolytic capacitor includes a sleeve portion containing electrolysis liquid therein. The sleeve portion has an axis defining an axial direction. The sleeve portion includes one end portion, another end portion away from the one end portion in the axial direction, and a peripheral surface extending between the one end portion and the another end portion. The explosion-proof valve is provided at the one end portion of the sleeve portion in the axial direction. The first wall is disposed in the casing and faces the explosion-proof valve in the axial direction with a space therebetween. The second wall extends from the first wall in the axial direction. The second wall faces at least a portion of the peripheral surface of the sleeve portion with a space therebetween. The specific region is provided in the second wall and has one of a recessed portion and a protruding portion. The recessed portion is recessed away from the peripheral surface. The protruding portion protrudes toward the peripheral surface.

According to another aspect, the disclosure provides a printing device including: a casing, a circuit board, an electrolytic capacitor, an explosion-proof valve, a first wall, a second wall, and a specific region. The circuit board is provided in the casing. The electrolytic capacitor is disposed in the casing and connected to the circuit board. The electrolytic capacitor includes a sleeve portion containing electrolysis liquid therein. The sleeve portion has an axis defining an axial direction. The sleeve portion includes one end portion, another end portion away from the one end portion in the axial direction, and a peripheral surface extending between the one end portion and the another end portion. The explosion-proof valve is provided at the one end portion of the sleeve portion in the axial direction. The first wall is disposed in the casing and faces the explosion-proof valve in the axial direction with a space therebetween. The second wall extends from the first wall in the axial direction. The second wall faces at least a portion of the peripheral surface of the sleeve portion with a space therebetween. The specific region is provided in the first wall and has one of a recessed portion and a protruding portion. The recessed portion is recessed away from the one end portion of the sleeve portion. The protruding portion protrudes toward the one end portion of the sleeve portion.

BRIEF DESCRIPTION OF THE DRAWINGS

The particular features and advantages of the disclosure will become apparent from the following description taken in connection with the accompanying drawings, in which.

DETAILED DESCRIPTION

A tape printer 1 according to one embodiment will be described with reference to FIGS. 1 through 7. In the following specification, an upper, a lower, a right upper, a left lower, a left upper and a right lower sides (directions) in FIG. 1 correspond to the front, the rear, the upper, the lower, the left and the right sides of the tape printer 1.

Outline of the tape printer 1 will be described with reference to FIGS. 1 through 3. The tape printer 1 includes a casing 2 generally rectangular shaped and elongated in an up-down direction in a plan view. The casing 2 has a box-like shape having a thickness in a front-rear direction, and has rounded corners. In an internal space of the casing 2, a print circuit board 4, a printing mechanism 12, and a tape accommodation portion 13 are provided. A CPU 41 adapted to control various operation performed in the tape printer 1 is mounted on the print circuit board 4. Details of the print circuit board 4 will be described later.

The printing mechanism 12 includes a thermal head 9 and a conveyer roller 19. The thermal head 9 and the conveyer roller 19 are arranged to oppose each other in a generally left-right direction. The thermal head 9 is an example of a printing unit configured to form an image on a printing medium. The thermal head 9 is a plate-like member having generally rectangular shape, and includes a plurality of heat generating elements (not shown) heated upon energization.

The conveyer roller 19 is rotatable about an axis of a rotation shaft (not shown) extending in the front-rear direction. The conveyer roller 19 is connected to a conveyer motor (not shown) provided inside the casing 2. The thermal head 9 and the conveyer motor are electrically connected to the CPU 41 of the print circuit board 4. The tape accommodation portion 13 is generally rectangular shape in a rear view, and has an open end opening rearward. A tape cassette 8 having generally box shape is detachably attached to the tape accommodation portion 13.

The tape cassette 8 accommodates therein, for example, a tape (not shown) which is a thermal type printing medium. The tape has one surface which is a printing surface colored upon heated by the thermal head 9, and has an opposite surface on which a release paper is adhered through an adhesive agent.

The thermal head 9 and the conveyer roller 19 are adapted to nip the tape therebetween such that the printing surface of the tape faces and contacts the thermal head 9. The CPU 41 is adapted to control driving of the conveyer motor while controlling power supply to the heat generating elements of the thermal head 9. By such control, the thermal head 9 forms a normal image of characters on the printing surface of the tape, and the conveyer roller 19 conveys the tape on which the characters are printed toward a discharge opening 18. Letters, numbers, diagram, and graphic symbols are examples of the characters.

The casing 2 will be described with reference to FIGS. 1, 2 and 4. Incidentally, in FIG. 2, a first wall portion 22A (described later) is omitted for simplicity. The casing 2 is made from a resin, and includes a front casing 21 and a rear casing 22. The front casing 21 constitutes a front wall, a front-side portion of an upper wall, a front-side portion of a lower wall, a front-side portion of a left wall and a front-side portion of a right wall of the casing 2. The front casing 21 has a rear end constituting an open end 21A. In the following description, each of a right lower portion and a left lower portion of the open end 21A will be referred to as "particular region 21B" (see FIG. 3). The two particular regions 21B are arranged to be spaced apart from each other in the left-right direction.

The rear casing 22 constitutes a rear wall, a rear-side portion of an upper wall, a rear-side portion of a lower wall, a rear-side portion of a left wall and a rear-side portion of a right wall of the casing 2. The rear casing 22 includes the first wall portion 22A (see FIG. 1) having a generally rectangular plate-like shape constituting a rear portion of the rear casing 22 (i.e., the rear wall of the casing 2). The first wall portion 22A covers the tape accommodation portion 13 and the printing mechanism 12 from behind. The rear casing 22 has a front end constituting an open end 22B whose profile in the plan view is coincident with that of the open end 21A. The open end 22B contacts the open end 21A to form the internal space of the casing 2. In other words, the rear casing 22 is connected to the front casing 21, so that the open end 21A is closed by the rear casing 22.

Figure 1:
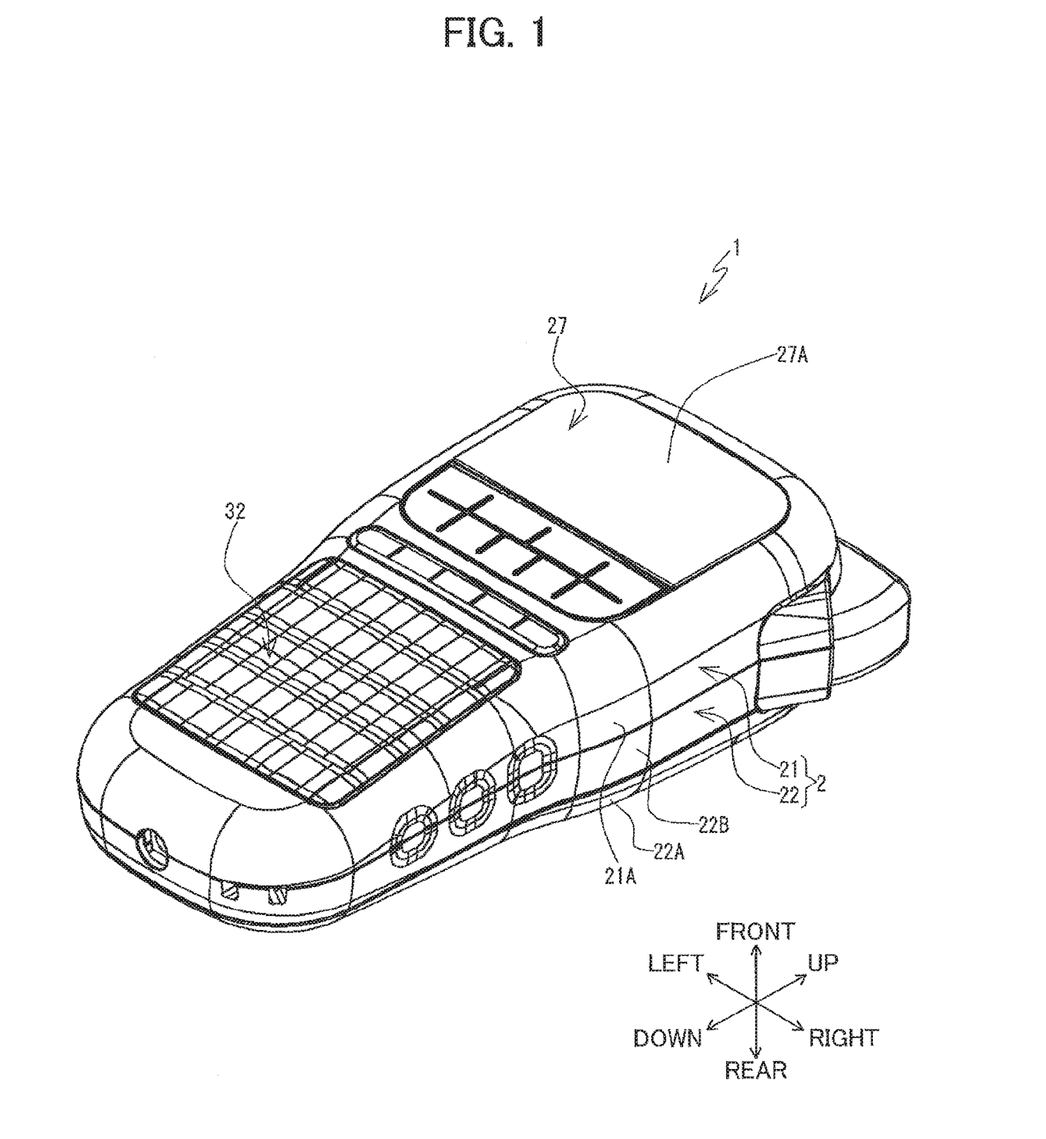
FIG. 1 is a perspective view of a tape printer according to one embodiment.
Figure 2:
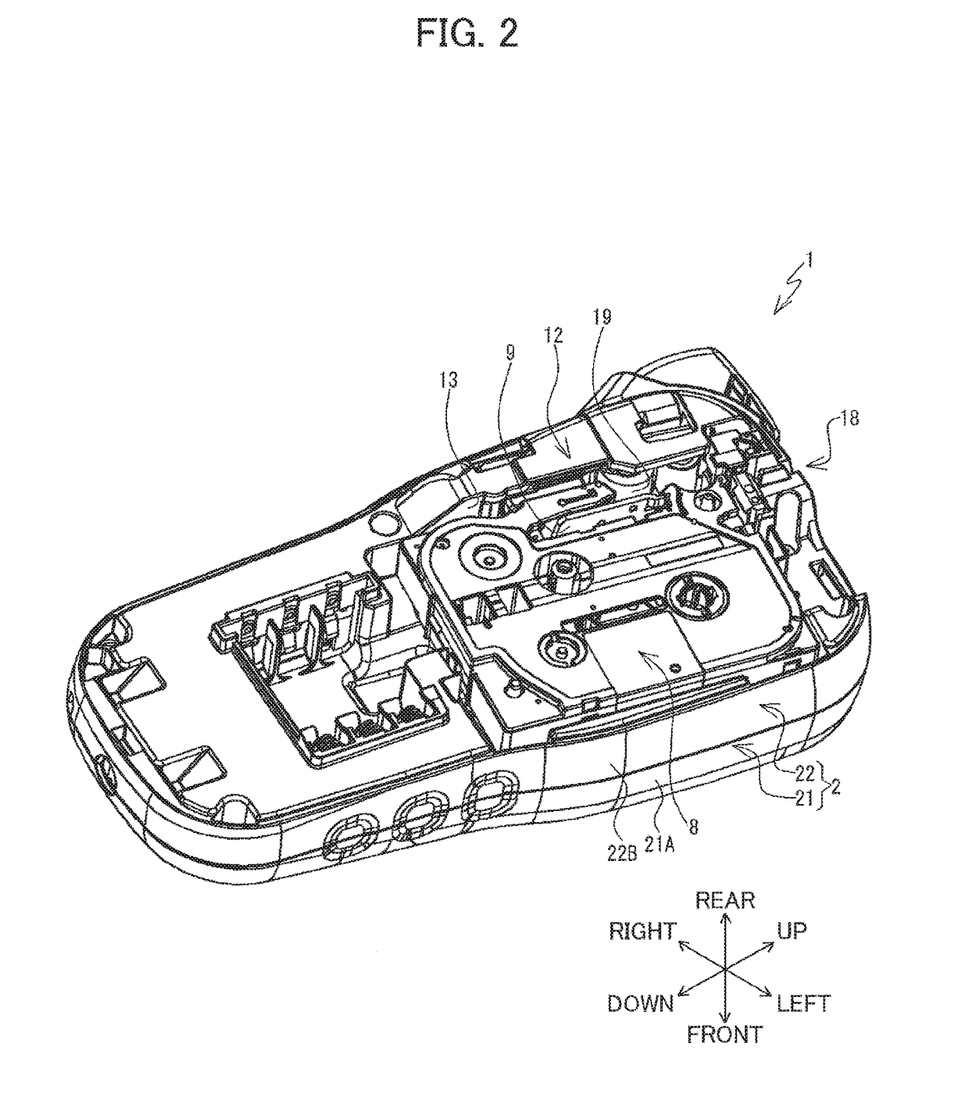
FIG. 2 is a perspective view of a casing of the tape printer according to the embodiment in which a first wall portion is omitted.

As illustrated in FIG. 1, the front casing 21 includes an input portion 32 and a display portion 27. The input portion 32 constitutes a lower portion of the front wall of the front casing 21, and includes a plurality of buttons. The tape printer 1 receives various inputted instructions through the input portion 32. The display portion 27 constitutes an upper portion of the front wall of the front casing 21 and is positioned above the input portion 32. The display portion 27 includes a window 27A having a plate shape and formed of a transparent or translucent resin. The front casing 21 is formed with a through-hole (not shown) at the front wall thereof, and the window 27A is fitted with the through-hole.

A liquid crystal display 5 is positioned rearward of the window 27A, i.e., an inside of the front casing 21. The liquid crystal display 5 is generally rectangular and elongated in the left-right direction. The liquid crystal display 5 has a front surface (not shown) facing the window 27A and provided with liquid crystal display elements. The liquid crystal display 5 is electrically connected to the CPU 41. Information displayed on the front surface of the liquid crystal display 5 by the instructions from CPU 41 is visible from the outside of the casing 2 through the window 27A.

Figure 3:
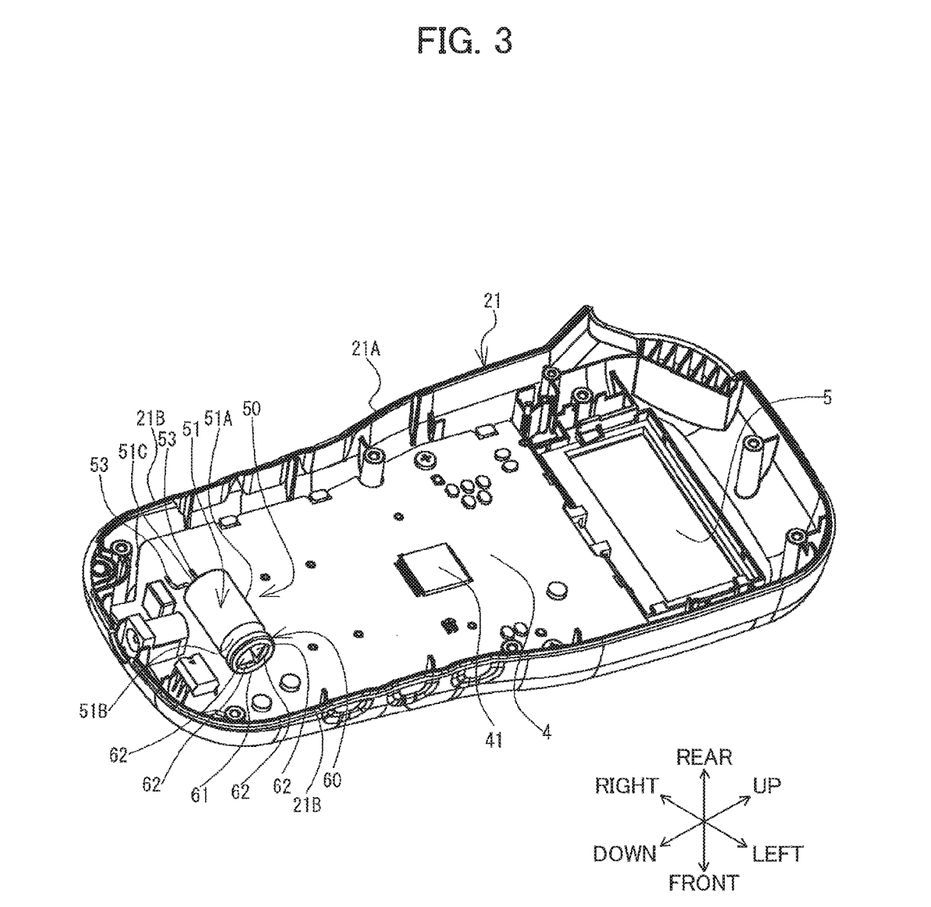
FIG. 3 is a perspective view of a front casing of the tape printer according to the embodiment.
Figure 4:
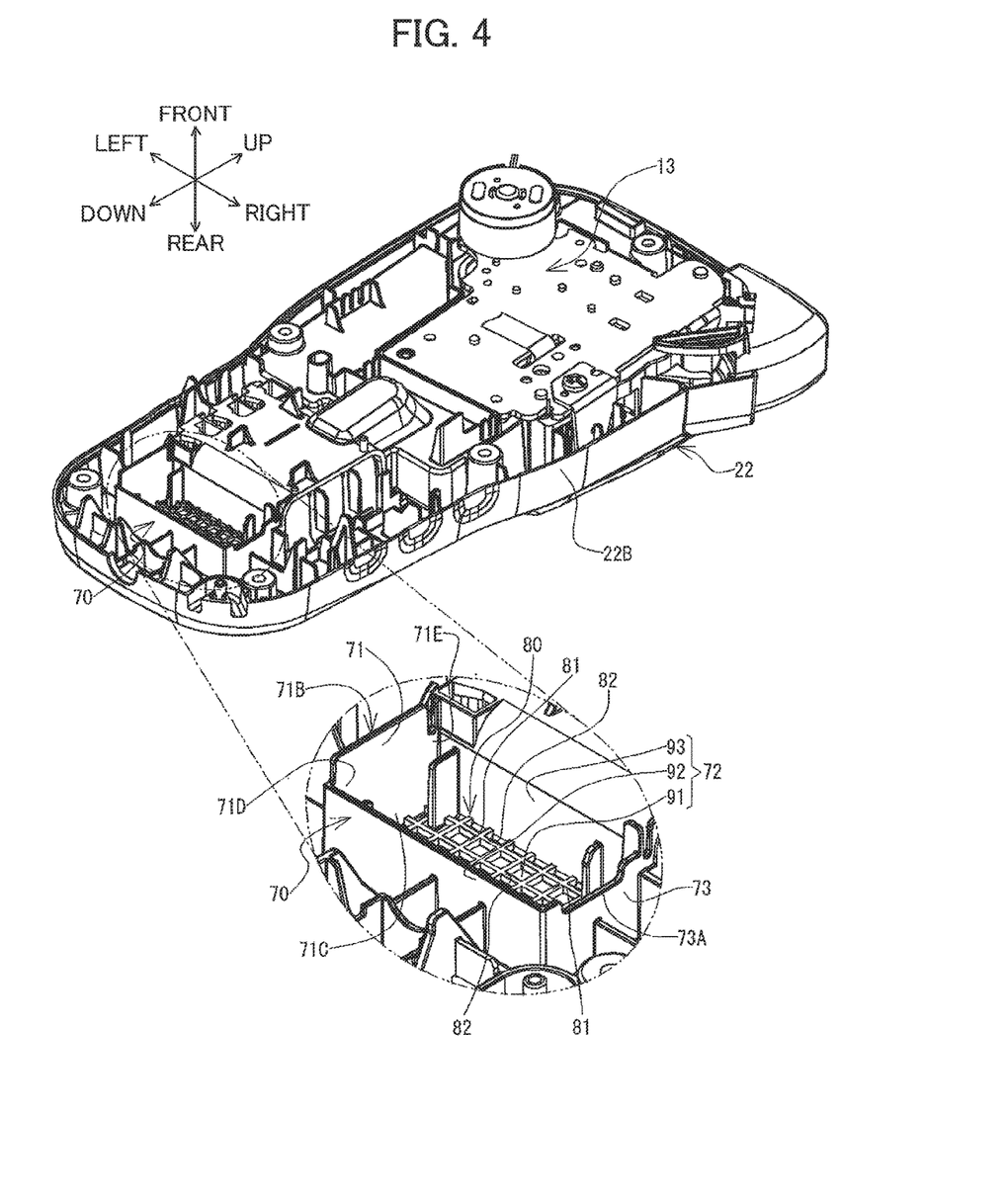
FIG. 4 is a perspective view of a rear casing of the tape printer according to the embodiment.

As illustrated in FIG. 3, the print circuit board 4 is provided inside the front casing 21. The print circuit board 4 is positioned rearward and downward of the liquid crystal display 5. The print circuit board 4 is generally rectangular shaped in the plan view and elongated in the up-down direction. The print circuit board 4 is positioned frontward of the open end 21A. The printed circuit board 4 may be formed of glass epoxy, paper phenol, or a composite thereof. The print circuit board 4 has a length in the left-right direction greater than that of the liquid crystal display 5. An electrolytic capacitor 50 having a predetermined electrostatic capacitance is provided at a lower portion of a rear surface of the print circuit board 4. The electrolytic capacitor 50 is adapted to supplement electrical current flowing through the electrical circuit mounted on the print circuit board 4.

Figure 5:
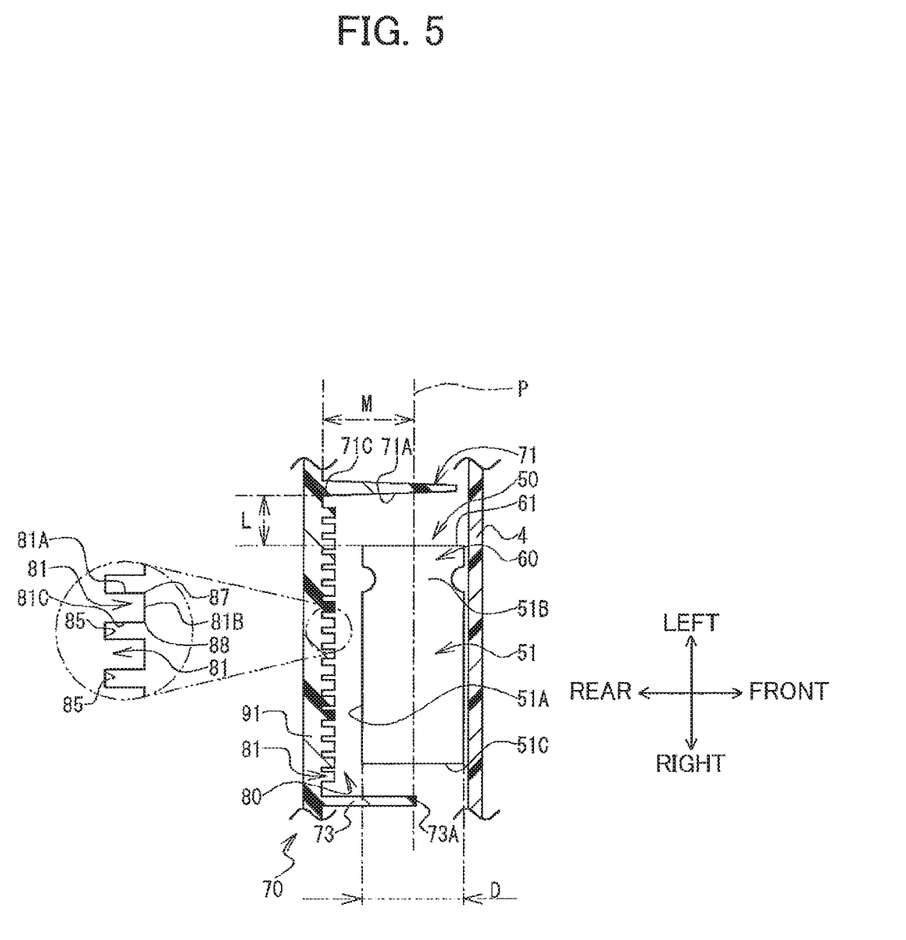
FIG. 5 is a cross-sectional view of an accommodation portion in the tape printer according to the embodiment.
Figure 6:
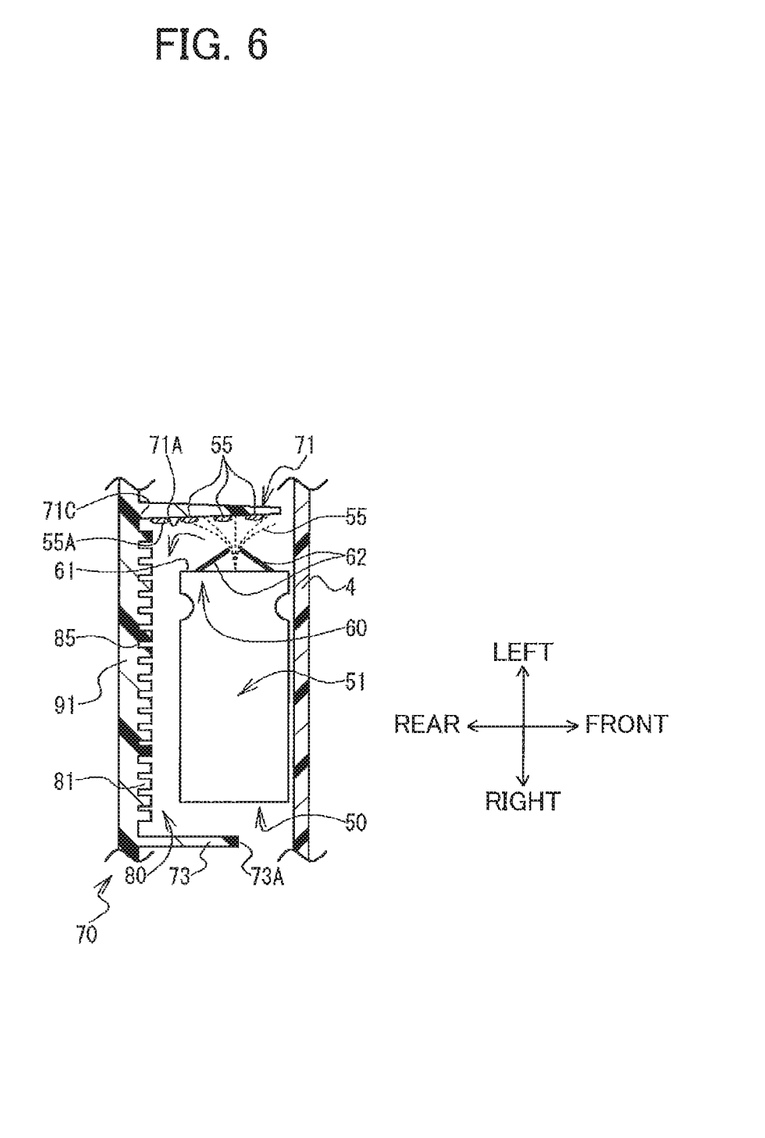
FIG. 6 is a cross-sectional view of the accommodation portion at a timing immediately after actuation of an explosion-proof valve of an electrolytic capacitor in the tape printer according to the embodiment.

The electrolytic capacitor 50 includes a sleeve portion 51 and two conductive wires 53. The sleeve portion 51 extends in the left-right direction and is provided at the rear surface of the print circuit board 4. In other words, the print circuit board 4 faces the sleeve portion 51 from its front side. The sleeve portion 51 is positioned between the two particular regions 21B in the left-right direction. In other words, the two particular regions 21B are aligned with the sleeve portion 51 in the left-right direction. As illustrated in FIG. 6, the sleeve portion 51 contains electrolysis liquid 55 therein. As illustrated in FIG. 5, the sleeve portion 51 has an axis P extending in the left-right direction. In other words, the axis P extends in an axial direction. In a lower portion of the casing 2, a contacting portion of the open end 21A and open end 22B is aligned with the axis P as viewed in the up-down direction. That is, the sleeve portion 51 is positioned so as to straddle a connecting portion of a lower portion of the front casing 21 and a lower portion of the rear casing 22 in the front-rear direction.

The sleeve portion 51 has a peripheral surface 51A extending in a circumferential direction of the sleeve portion 51. The sleeve portion 51 has a left end portion referred to as one end portion 51B and a right end portion referred to as another end portion 51C. That is, the peripheral surface 51A extends between the one end portion 51B and the other end portion 51C. The two conductive wires 53 connect the other end portion 51C to the rear surface of the print circuit board 4. The two conductive wires 53 are connected to the print circuit board 4 at a position rightward of and spaced apart from the other end portion 51C.

An explosion-proof valve 60 is provided at the one end portion 51B. The explosion-proof valve 60 is generally circular shaped as viewed from its left side. A closing portion 61 for closing an interior of the sleeve portion 51 is provided at a left end portion of the explosion-proof valve 60. The closing portion 61 is formed with four grooves arranged in the circumferential direction of the sleeve portion 51 to be spaced away from each other at an equal angle. Each of the grooves is open leftward and extends linearly in a radial direction of the sleeve portion 51. A shield portion 62 is defined between neighboring grooves, so that the four shield portions 62 are provided to be arranged in the circumferential direction of the sleeve portion 51. Each shield portion 62 is plate shaped having a thickness in the left-right direction, and has a sector shape. That is, the widths of the shield portions 62 in the circumferential direction become small as the shield portion 62 extends toward a diametrical center of the sleeve portion 51 (i.e., the axis P).

An accommodation portion 70 for accommodating therein the sleeve portion 51 of the electrolytic capacitor 50 will be described with reference to FIGS. 4 and 5. FIG. 5 is a cross-sectional view showing a central portion of the accommodation portion 70 in the up-down direction as viewed from below. In each of FIGS. 5 through 8, hatching indicating the cross-sectional shape of the electrolytic capacitor 50 is omitted, and illustration of a third extension wall 93 (illustrated in FIG. 4) is also omitted for simplicity. The accommodation portion 70 is box shaped elongated in the left-right direction in the plan view and has an opening open frontward. The accommodation portion 70 is integrally configured with the rear casing 22, and includes a first wall 71, a second wall 72, a specific region 80 and a third wall 73.

The first wall 71 is plate shaped having a thickness in the left-right direction. The first wall 71 faces the closing portion 61 of the explosion-proof valve 60 and is positioned leftward of the closing portion 61 with a space therebetween. The first wall 71 is positioned rearward of the print circuit board 4 with a space therebetween. The first wall 71 has a center portion in both the front-rear direction and the up-down direction, and the axis P passes through the center portion of the first wall 71 in the left-right direction. A right surface of the first wall 71 facing the explosion-proof valve 60 includes a sloped portion 71A (see FIG. 5) positioned rearward of the axis P. The sloped portion 71A is inclined toward the right as extending rearward. That is, the sloped portion 71A is inclined toward the right as the sloped portion 71A extends away from the axis P.

A peripheral end portion 71B is an end portion of the first wall 71 in the radial direction of the sleeve portion 51. That is, the peripheral end portion 71B defines a profile of the first wall 71. Here, the radial direction extends perpendicularly to the axis P and extends away from the axis P. The peripheral end portion 71B includes a rear end portion 71C, a lower end portion 71D, and an upper end portion 71E. The rear end portion 71C is a rear end portion of the first wall 71. The lower end portion 71D is a lower end portion of the first wall 71. The upper end portion 71E is an upper end portion of the first wall 71.

In the present embodiment, a maximum distance between the peripheral end portion 71B and the axis P in the radial direction is the distance between the rear end portion 71C and the axis P in the radial direction. The maximum distance is indicated by dimension "M" in FIG. 5. The dimension M is greater than half the length of a diameter "D" (see FIG. 5) which is an outer diameter of the sleeve portion 51. In other words, at least a portion of the peripheral end portion 71B is positioned farther away from the axis P in the radial direction of the sleeve portion 51 than the peripheral surface 51A is from the axis P in the radial direction. That is, a distance between at least the portion of the peripheral end portion 71B and the axis P in the radial direction is greater than a distance between the peripheral surface 51A and the axis P in the radial direction.

In the present embodiment, a minimum distance between the first wall 71 and the explosion-proof valve 60 is a distance between the rear end portion 71C and the closing portion 61 in the left-right direction. This minimum distance is represented by a dimension "L" (see FIG. 5). This minimum dimension L is not more than half the length of the diameter D of the sleeve portion 51. That is, the minimum distance between the first wall 71 and the explosion-proof valve 60 is greater than zero and not more than half the length of the outer diameter of the sleeve portion 51.

The second wall 72 extends rightward from the rear end portion 71C, lower end portion 71D and upper end portion 71E of the first wall 71. In other words, the second wall 72 extends rightward from a profile end of the sloped portion 71A. The second wall 72 includes a first extension wall 91, a second extension wall 92, and a third extension wall 93.

The first extension wall 91 is generally rectangular plate shaped extending rightward from the rear end portion 71C of the first wall 71. The first extension wall 91 and the print circuit board 4 are arranged in the front-rear direction with the electrolytic capacitor 50 interposed therebetween, as illustrated in FIG. 5. The first extension wall 91 is positioned rearward of the sleeve portion 51 and faces a rear portion of the peripheral surface 51A of the sleeve portion 51 with a space therebetween.

The second extension wall 92 is generally rectangular plate shaped extending rightward from the lower end portion 71D of the first wall 71. The second extension wall 92 is connected to a lower end portion of the first extension wall 91. The third extension wall 93 is generally rectangular plate shaped extending rightward from the upper end portion 71E of the first wall 71. The third extension wall 93 is connected to an upper end portion of the first extension wall 91. Each of the second extension wall 92 and the third extension wall 93 are disposed so as to extend perpendicularly to the first specific wall 91. The second extension wall 92 and the third extension wall 93 are arrayed in the up-down direction with the sleeve portion 51 of the electrolytic capacitor 50 interposed therebetween.

The specific region 80 is provided at the first extension wall 91. In the present embodiment, the specific region 80 is a grid-like convex portion protruding frontward from a front surface of the first extension wall 91. Specifically, the specific region 80 includes a plurality of vertical ribs 81 extending linearly in the up-down direction and arrayed to be spaced apart from one another in the left-right direction, and a plurality of horizontal ribs 82 extending in the left-right direction and arrayed to be spaced apart from one another in the up-down direction. Accordingly, neighboring two vertical ribs 81 and neighboring two horizontal protrusion 82 define a recess 85 (FIG. 5) having a rectangular shape in the plan view. Incidentally, FIG. 5 does not illustrate the horizontal ribs 82.

The vertical rib 81 has a first surface 81A extending in the front-rear direction, a second surface 81B extending rightward from a front end of the first surface 81A, and a third surface 81C extending rearward from a right end of the second surface 81B. The first surface 81A and the third surface 81C are parallel to each other. The second surface 81B is directed perpendicularly to the first surface 81A. In the following description, a connecting portion between the first surface 81A and the second surface 81B will be referred to as a first corner portion 87, and a connecting portion between the second surface 81B and the third surface 81C will be referred to as a second corner portion 88. In other words, the first surface 81A and the second surface 81B define the first corner portion 87, and the second surface 81B and the third surface 81C define the second corner portion 88.

The third wall 73 is connected to the right end portion of the second wall 72 and is generally rectangular plate shaped. The third wall 73 is positioned rightward of the other end portion 51C of the sleeve portion 51, and faces the other end portion 51C with a space therebetween. That is, the third wall 73 and the first wall 71 are arranged in the left-right direction such that the sleeve portion 51 is interposed between the first wall 71 and the third wall 73. The third wall 73 has a front end portion formed with a notched portion 73A recessed rearward and positioned at a center portion of the front end portion in the up-down direction. The notched portion 73A allows the two conductive wires 53 (FIG. 3) of the electrolytic capacitor 50 to pass therethrough. A connecting portion between the conductive wires 53 and the print circuit board 4 is positioned rightward of the third wall 73, i.e., outside of the accommodation portion 70.

Actuation of the explosion-proof valve 60 will be described with reference to FIGS. 4, 6 and 7. When internal pressure of the sleeve portion 51 exceeds a predetermined level due to unexpected factor, the closing portion 61 splits to open the explosion-proof valve 60. Assuming that the tape printer 1 is oriented such that the right surface of the tape printer 1 extends along the vertical direction as illustrated in FIG. 1, when the explosion-proof valve 60 is actuated.

Figure 7:
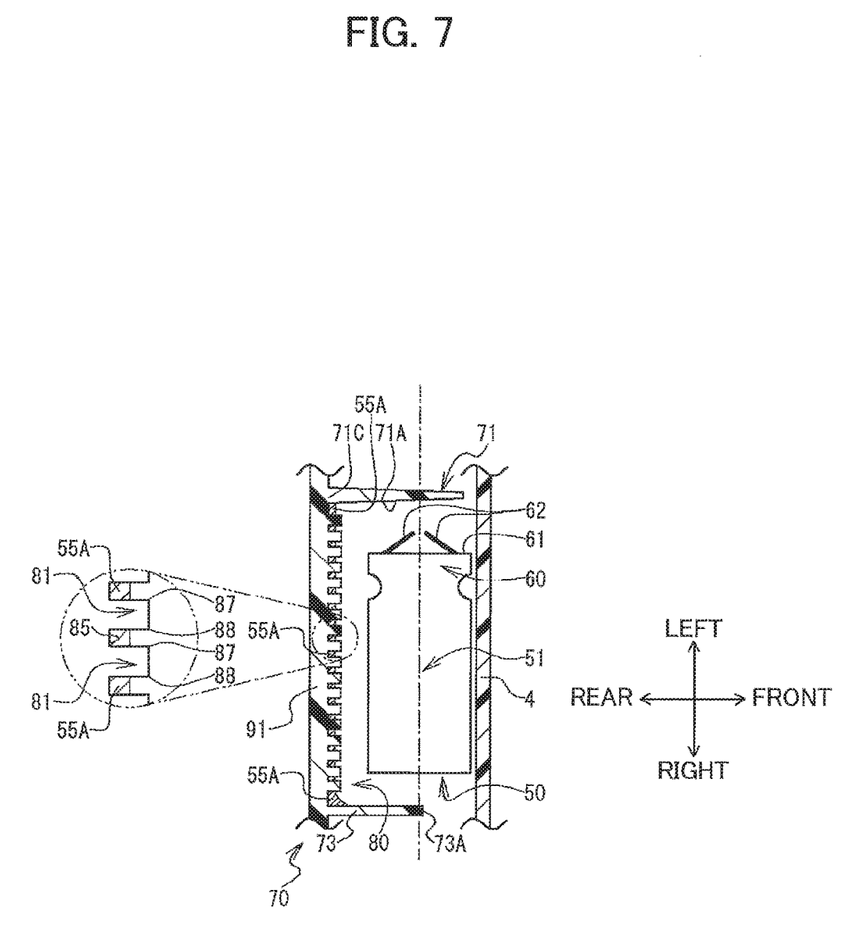
FIG. 7 is a cross-sectional view of the accommodation portion in which a first electrolysis liquid is passing through a first extension wall in the tape printer according to the embodiment.

If the explosion-proof valve 60 is operated, the four shield portions 62 are deformed leftward such that each outermost end portion in the radial direction of each shield portion 62 functions as a base end as illustrated in FIG. 7. Each end of the shield portions 62 positioned at an innermost side in the radial direction (each end adjacent to the axis P) is moved to be away from each other by the deformation. The innermost ends of the shield portions 62 are moved to be positioned leftward of the one end portion 51B of the sleeve portion 51 but rightward of the first wall 71. Note that each innermost end of each deformed shield portion 62 may contact the first wall 71.

By the separation of the four shield portions 62 from each other, the closing portion 61 closing the sleeve portion 51 splits, so that the interior of the sleeve portion 51 is open to the outside. As a result, the electrolysis liquid 55 contained in the sleeve portion 51 becomes gaseous state, and is discharged leftward from the interior of the sleeve portion 51 (see FIG. 6). The discharged electrolysis liquid 55 contacts the first wall 71 to be cooled and liquidized.

The electrolysis liquid 55 liquidized at the first wall 71 includes a first electrolysis liquid 55A, a second electrolysis liquid (not illustrated) and a third electrolysis liquid (not illustrated). The first electrolysis liquid 55A flows the sloped portion 71A of the first wall 71 to move rearward (see FIG. 6). The first electrolysis liquid 55A moves past the rear end portion 71C of the first wall 71, and passes through the front surface of the first extension wall 91 to move rightward. The first electrolysis liquid 55A passes through the plurality of vertical protrusions 81 and the plurality of the horizontal ribs 82 and is moved toward a connecting portion between the first extension wall 91 and the third wall 73. Accordingly, the first electrolysis liquid 55A is accumulated in the plurality of recesses 85 and the connecting portion between the first extension wall 91 and the third wall 73 (see FIG. 7). Consequently, this arrangement can prevent the electrolysis liquid 55 discharged by the actuation of the explosion-proof valve 60 from being scattered to the outside of the accommodation portion 70. Incidentally, the first electrolysis liquid 55A moving past the plurality of the vertical ribs 81 passes through the first corner portions 87 and the second corner portions 88 of the vertical ribs 81. With this configuration, a moving distance of the first electrolysis liquid 55A is increased.

The second electrolysis liquid passes through the lower end portion 71D (see FIG. 4) of the first wall 71, and is flowing the second extension wall 92 (see FIG. 4) to move rightward. The second electrolysis liquid is accumulated at a connecting portion between the third wall 73 and the second extension wall 92 (not illustrated). The third electrolysis liquid passes through the upper end portion 71E (see FIG. 4) of the first wall 71, and is flowing the third extension wall 93 (FIG. 4) to move rightward. The third electrolysis liquid is accumulated at a connecting portion between the third wall 73 and the third extension wall 93.

The gaseous electrolysis liquid 55 discharged from the sleeve portion 51 contacts the first wall 71, so that the gaseous electrolysis liquid 55 is cooled and liquidized. However, cooling and liquefaction of the gaseous electrolysis liquid 55 may be performed by contacting the component other than the first wall 71. For example, the gaseous electrolysis liquid 55 may be cooled and liquidized by contacting the print circuit board 4. Alternatively, the gaseous electrolysis liquid 55 may be cooled and liquidized by contacting the specific region 80 of the first extension wall 91.

As described above, scattering of the electrolysis liquid 55 outside of the accommodation portion 70 can be prevented by the first wall 71 and the first extension wall 91 of the second wall 72 even if the electrolysis liquid 55 is discharged leftward through the actuated explosion-proof valve 60. In this instance, the specific region 80 is provided at the front surface of the first extension wall 91. Therefore, the electrolysis liquid 55 passes through long distance when the electrolysis liquid 55 moves past the front surface of the first extension wall 91 to move rightward, in comparison with a case where the nothing is provided on the front surface of the first extension wall 91. Accordingly, the electrolysis liquid 55 can be easily accumulated at the specific region 80. Consequently, the resultant tape printer 1 can restrain the electrolysis liquid 55 of the electrolytic capacitor 50 from scattering in the internal space of the casing 2. Further, the electrolysis liquid 55 does not easily reach the liquid crystal display 5 since the accommodation portion 70 restricts the electrolysis liquid 55 from being scattered outside thereof. Thus, breakdown of the liquid crystal display 5 can be prevented in the tape printer 1.

Further, at least a portion of the peripheral end portion 71B is positioned farther away from the axis P in the radial direction of the sleeve portion 51 than the peripheral surface 51A is from the axis P in the radial direction. This configuration can restrain the electrolysis liquid 55 discharged through the explosion-proof valve 60 from scattering outward of the peripheral end portion 71B in the radial direction. Also, the discharged electrolysis liquid 55 can easily contact the first wall 71.

Further, the minimum distance between the first wall 71 and the explosion-proof valve 60 is greater than zero and not more than half the length of the outer diameter of the sleeve portion 51. That is, the minimum distance from the first wall 71 to the explosion-proof valve 60 is short enough to facilitate the contact of the electrolysis liquid 55 discharged through the explosion-proof valve 60 with the first wall 71.

The first wall 71 includes the sloped portion 71A. The sloped portion 71A encourages the electrolysis liquid 55 liquidized at the first wall 71 to move rearward along the sloped portion 71A. As a result, scattering of the electrolysis liquid 55 outside of the accommodation portion 70 can be restrained, and the contact of the electrolysis liquid 55 with the print circuit board 4 can be restrained.

The plurality of vertical ribs 81 includes the first corner portion 87 and the second corner portion 88. The first electrolysis liquid 55A flowing rightward along the vertical rib 81 moves past the first corner portion 87 and the second corner portion 88. Thus, the movement distance of the first electrolysis liquid 55A along the first extension wall 91 can be increased. Thus, the first electrolysis liquid 55A can be easily accumulated at the front surface of the first extension wall 91.

The plurality of horizontal ribs 82 linearly extends in the left-right direction, and is arrayed to be spaced apart from each other in the up-down direction. Therefore, a surface area of the first extension wall 91 can be increased, and the movement distance of the first electrolysis liquid 55A along the first extension wall 91 can be increased. Consequently, accumulation of the first electrolysis liquid 55A at the front surface of the first extension wall 91 can further be facilitated.

The second wall 72 includes the first extension wall 91. The first extension wall 91 is positioned opposite to the print circuit board 4 with respect to the sleeve portion 51. The electrolysis liquid 55 liquidized by contacting the first wall 71 includes the first electrolysis liquid 55A, and the first electrolysis liquid 55A passes through the first extension wall 91 spaced apart from the print circuit board 4. This configuration can restrain the electrolysis liquid 55 from contacting the print circuit board 4.

The second wall 72 includes the second extension wall 92 and the third extension wall 93. The second extension wall 92 and the third extension wall 93 face the sleeve portion 51 in the up-down direction. The electrolysis liquid 55 discharged from the sleeve portion 51 can be easily accumulated in the accommodation portion 70 because the discharged electrolysis liquid 55 flows the second extension wall 92 and the third extension wall 93. Accordingly, scattering of the electrolysis liquid 55 outward of the accommodation portion 70 can be restrained.

The accommodation portion 70 includes the third wall 73. The first electrolysis liquid 55A is accumulated at the connecting portion between the first extension wall 91 and the third wall 73, the second electrolysis liquid is accumulated at the connecting portion between the second extension wall 92 and the third wall 73, and the third electrolysis liquid is accumulated at the connecting portion between the third extension wall 93 and the third wall 73. Accordingly, the electrolysis liquid 55 discharged through the explosion-proof valve 60 is not easily scattered outward of the accommodation portion 70.

The sleeve portion 51 is positioned between the two particular regions 21B in the left-right direction. Since the electrolysis liquid 55 is not easily scattered outward of the accommodation portion 70, the electrolysis liquid 55 does not easily reach the two particular regions 21B. Consequently, leakage of the electrolysis liquid 55 out of the casing 2 at a connecting portion between the open end 21A and the open end 22B can be restrained.

The present disclosure is not limited to the above-described embodiment. For example, in the above-described embodiment, the minimum distance between the first wall 71 and the explosion-proof valve 60 is the distance between the rear end portion 71C and the closing portion 61 of the explosion-proof valve 60 in the left-right direction. Instead of this distance, the minimum distance can be a distance between the lower end portion 71D and the closing portion 61 in the left-right direction, or a distance between the upper end portion 71E and the closing portion 61 in the left-right direction.

In the above-described embodiment, the maximum radial distance between the peripheral end portion 71B and the axis P is the radial distance between the rear end portion 71C and the axis P. Instead of the distance, the maximum distance can be a radial distance between the lower end portion 71D and the axis P, or a radial distance between the upper end portion 71E and the axis P.

In the above-described embodiment, the specific region 80 includes both the plurality of vertical ribs 81 and the plurality of horizontal ribs 82. However, either one of the vertical ribs 81 or horizontal ribs 82 may be provided. Further, in the above-described embodiment, the vertical rib 81 includes the first corner portion 87 and the second corner portion 88. However, the vertical ribs 81 may include either one of the first corner portion 87 or the second corner portion 88. Further, neither of the first corner portion 87 and the second corner portion 88 may be provided in the vertical rib 81. In the latter case, the vertical ribs 81 may be curved frontward from the first extension wall 91.

Figure 8:
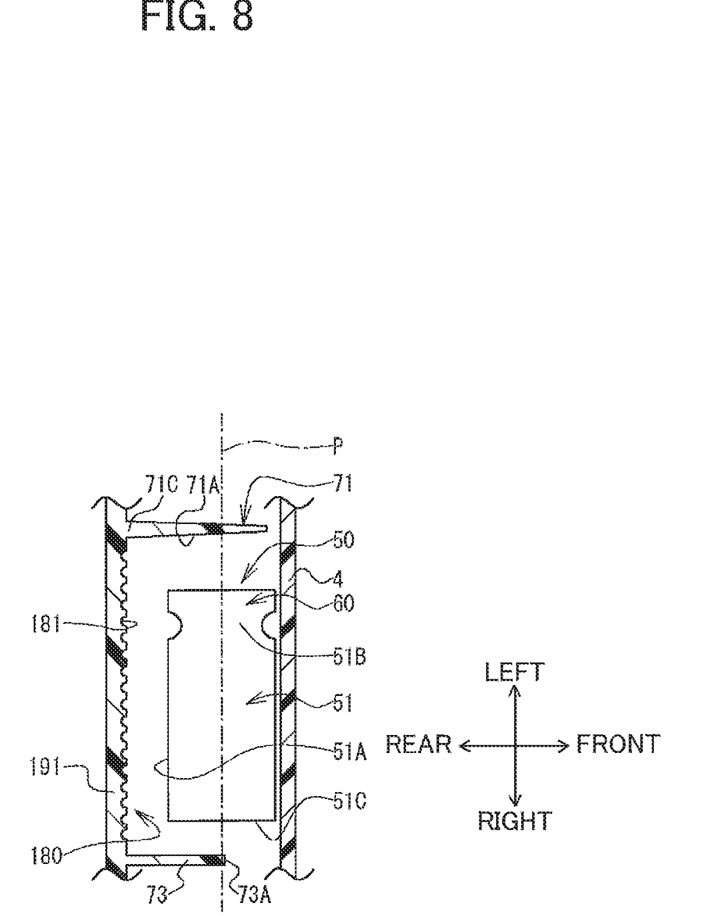
FIG. 8 is a cross-sectional view of an accommodation portion having a modified specific region in a tape printer according to a first modification.

In the above-described embodiment, the specific region 80 includes the vertical ribs 81 and the horizontal ribs 82 protruding toward the axis P. Instead of these ribs, the specific region 80 may be provided with recessed portions recessed rearward to he away from the axis P. Here, a first modification of the embodiment will be described. In FIG. 8, a specific region 180 as a modification to the specific region 80 is illustrated. In the specific region 180, instead of the vertical ribs 81 and the horizontal ribs 82, a plurality of recessed portions 181 are provided. Each recessed portion has an arcuate shape recessed from a front surface of a first extension wall 191 in a direction away from the axis P. The plurality of recessed portions 181 are formed at the front surface of the first extension wall 191 at equal interval in the left-right direction and in the up-down direction. With this configuration, the electrolysis liquid 55 passing through the first extension wall 191 can be easily accumulated in the recessed portions 181.

Figure 9:
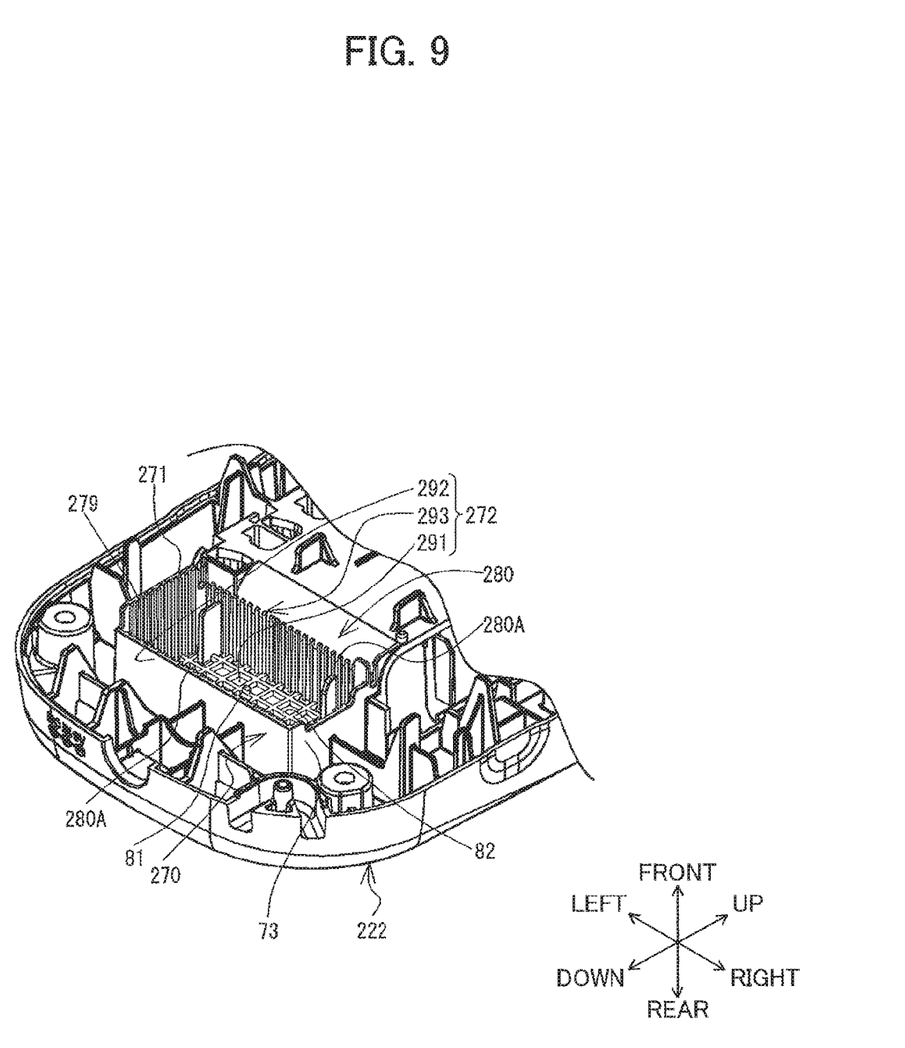
FIG. 9 is a perspective view of a modified rear casing in a tape printer according to a second modification.

Next, a second modification to the embodiment will be described. The configuration of the accommodation portion 70 is not limited to the above-described embodiment. FIG. 9 illustrates a rear casing 222 as a modification to the rear casing 22. In the rear casing 222, like parts and components are designated by the same reference numerals as those shown in the rear casing 22. The rear casing 222 includes an accommodation portion 270 instead of the accommodation portion 70. The accommodation portion 270 includes a first wall 271 and a second wall 272 instead of the first wall 71 and the second wall 72. The first wall 271 has a right surface provided with a plurality of ribs 279 linearly extending in the front-rear direction and arranged to be spaced apart from each other in the up-down direction. The second wall 272 includes a first extension wall 291, a second extension wall 292, and a third extension wall 293.

The accommodation portion 270 includes a specific region 280 instead of the specific region 80. The specific region 280 includes a plurality of ribs 280A linearly extending in the front-rear direction in addition to the vertical ribs 81 and the horizontal ribs 82. The plurality of the ribs 280A is provided at the second extension wall 292 and the third extension wall 293. The plurality of the ribs 280A is arrayed in the left-right direction with a space between the neighboring ribs.

In the accommodation portion 270, surface areas at the right surface of the first wall 271, at the upper surface of the second extension wall 292, and at the lower surface of the third extension wall 293 are increased, because the plurality of ribs 279 are provided on the first wall 271 and the plurality of ribs 280A are provided at the second extension wall 292 and the third extension wall 293, respectively. Therefore, movement distance of the electrolysis liquid 55 discharged from the sleeve portion 51 and moving along the accommodation portion 270 can be increased. Accordingly, the electrolysis liquid 55 can be easily accumulated in the accommodation portion 270. Incidentally, the plurality of ribs 279 provided on the first wall 271 may function as the specific region in which the electrolysis liquid 55 is accumulated. Further, the right surface of the first wall 271 may be provided with a plurality of recessed portion, instead of the plurality of ribs 279.

Figure 10:
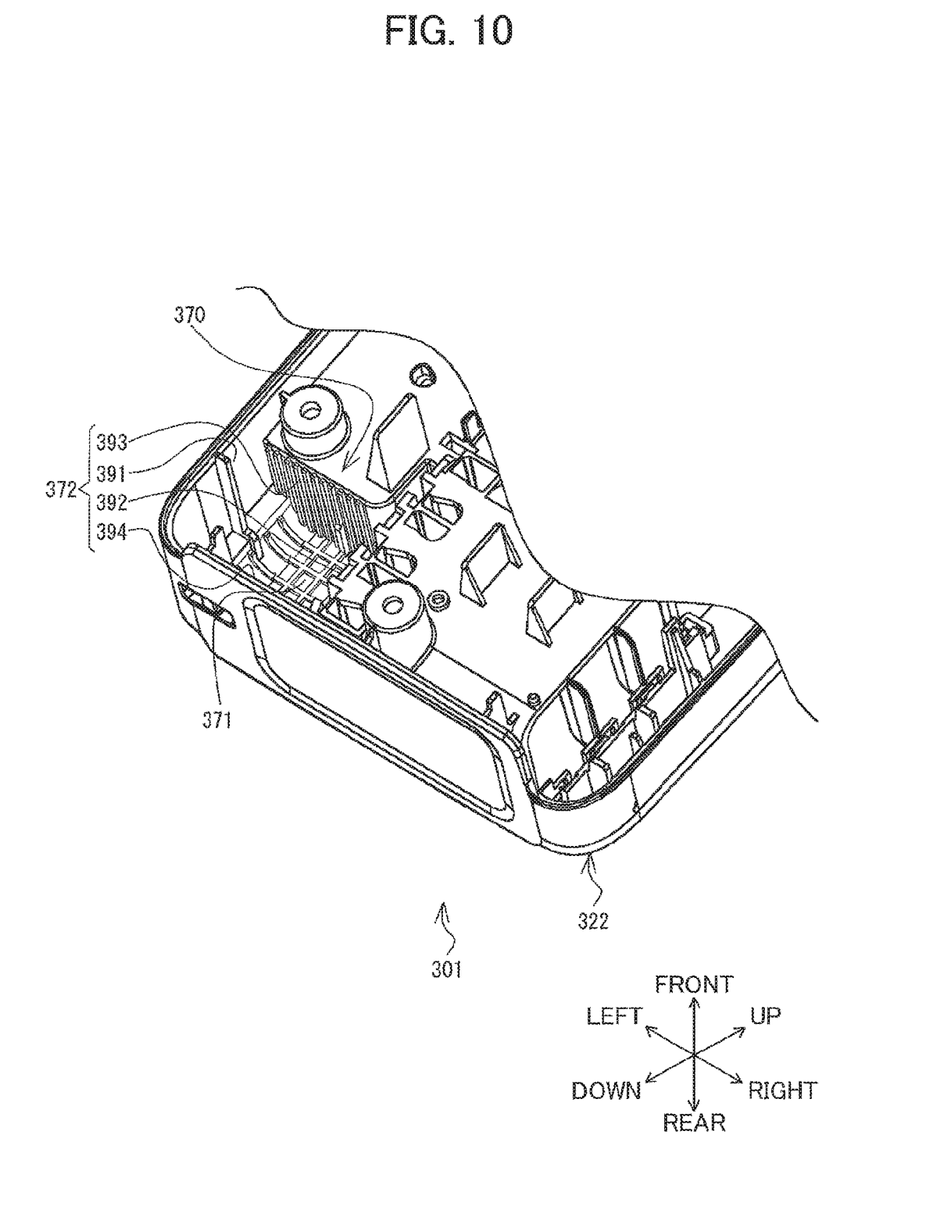
FIG. 10 is a perspective view of a further modified rear casing in a tape printer according to a third modification.
Figure 11:
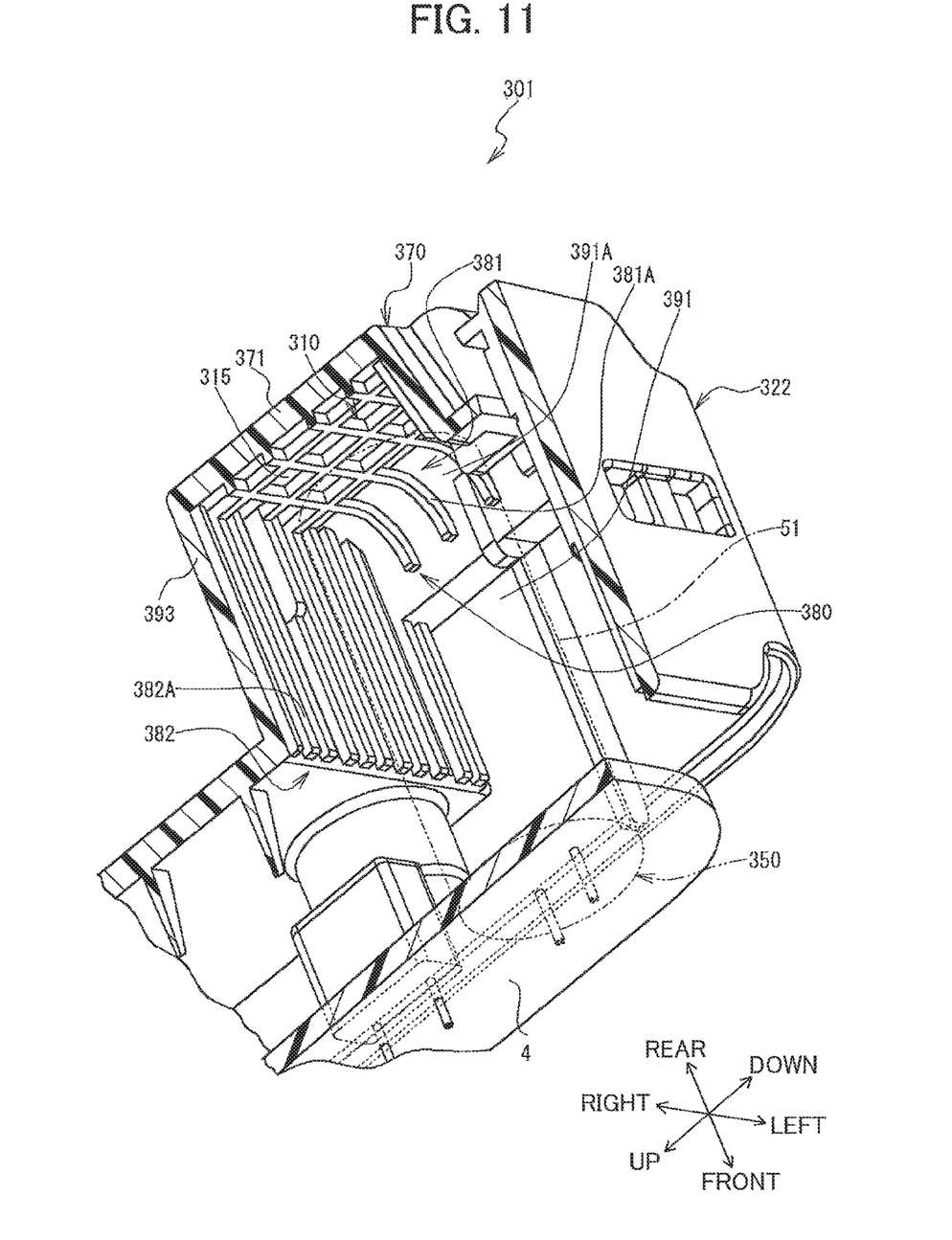
FIG. 11 is another perspective view of the further modified rear casing in the tape printer according to the third modification.

A third modification to the embodiment will be described. FIGS. 10 and 11 illustrate a tape printer 301 as a modification to the tape printer 1. In FIGS. 10 and 11, like parts and components are designated by the same reference numerals as those shown in the tape printer 1. The tape printer 301 includes a rear casing 322 instead of the rear casing 22. The print circuit board 4 is provided at a position inside of the rear casing 322. The print circuit board 4 is provided with an electrolytic capacitor 350 instead of the electrolytic capacitor 50. In FIG. 11, the electrolytic capacitor 350 is indicated by a two dotted chain line. The electrolytic capacitor 350 includes the sleeve portion 51, in the same way as the electrolytic capacitor 50. In the tape printer 301, the sleeve portion 51 is connected to the print circuit board 4 with a posture extending in the front-rear direction. That is, an axis (not illustrated) of the sleeve portion 51 extends in the front-rear direction. In the third modification, a rear end portion of the sleeve portion 51 will be referred to as one end portion, while a front end portion of the sleeve portion 51 will be referred to as another end portion. The other end portion of the sleeve portion 51 is connected to the print circuit board 4. Although not illustrated in the drawings, the one end portion of the sleeve portion 51 is provided with the explosion-proof valve 60.

The rear casing 322 includes an accommodation portion 370 instead of the accommodation portion 70. The accommodation portion 370 includes a first wall 371, a second wall 372, and a specific region 380. The first wall 371 is generally rectangular plate shaped and positioned rearward of the one end portion of the sleeve portion 51. The first wall 371 faces the one end portion of the sleeve portion 51 with a space therebetween. The first wall 371 has a front surface provided with a rib 310 protruding toward the sleeve portion 51. The rib 310 has a grid-like shape in the plan view. Accordingly, a plurality of recesses 315 that is rectangular shaped in the plan view is formed at the front surface of the first wall 371.

The second wall 372 extends frontward from a peripheral end portion of the first wall 371. The second wall 372 is positioned outward of the sleeve portion 51 of the electrolytic capacitor 350 in a circumferential direction of the sleeve portion 51, and faces the sleeve portion 51 with a space therebetween. The second wall 372 includes a first extension wall 391, a second extension wall 392, a third extension wall 393, and a fourth extension wall 394. The first extension wall 391 extends frontward from a left end portion of the first wall 371. The first extension wall 391 has a rear end portion 391A curved frontward as the rear end portion 391A extends leftward. The second extension wall 392 extends frontward from a right end portion of the first wall 371. The third extension wall 393 extends frontward from an upper end portion of the first wall 371. The fourth extension wall 394 extends frontward from a lower end portion of the first wall 371. The first extension wall 391 and the second extension wall 392 are arrayed in the left-right direction with the sleeve portion 51 interposed therebetween. The third extension wall 393 and the fourth extension wall 394 are arrayed in the up-down direction with the sleeve portion 51 interposed therebetween.

The specific region 380 includes a first specific region 381 and a second specific region 382. The first specific region 381 includes a plurality of ribs 381A protruding toward the sleeve portion 51 from the rear end portion 391A of the first extension wall 391. Each of the ribs 381A is curved along the curvature of the rear end portion 391A. The plurality of ribs 381A is arranged in the up-down direction with a space between neighboring ribs.

The second specific region 382 includes a plurality of ribs 382A protruding toward the sleeve portion 51 (protruding downward) from the third extension wall 393. The ribs 382A linearly extend in the front-rear direction and arranged to be spaced apart from one another in the left-right direction.

In the tape printer 301, the electrolysis liquid 55 (see FIG. 6) is cooled and liquidized as a result of contact with the first wall 371 when the explosion-proof valve 60 of the electrolytic capacitor 350 is actuated. The liquidized electrolysis liquid 55 is easily accumulated in the recessed portion 315. The electrolysis liquid 55 liquidized at the first wall 371 may be moved frontward along the second wall 372. In this case, the electrolysis liquid 55 passing through the first extension wall 391 is easily accumulated in recesses formed between the neighboring ribs 381A, and the electrolysis liquid 55 moving along the third extension wall 393 is easily accumulated in recesses provided between neighboring ribs 382A. Accordingly, the tape printer 301 can restrain the electrolysis liquid 55 discharged from the sleeve portion 51 from being scattered outward of the accommodation portion 370.

The tape printer 1 and the tape printer 301 are an example of a printing device. The print circuit board 4 is an example of a circuit board. The vertical ribs 81, the ribs 279, the ribs 280A, the ribs 381A and the ribs 382A are an example of a protruding portion. The first surface 81A and the second surface 81B are examples of two surfaces. The first corner portion 87 is an example of a corner portion. The first extension wall 91, the first extension wall 191 and the first extension wall 291 are an example of a first specific wall. The second extension wall 92, the second extension wall 292, the third extension wall 93 and the third extension wall 293 are an example of a second specific wall. The front casing 21 is an example of a first casing. The rear casing 22, the rear casing 222 and the rear casing 322 are an example of a second casing.

While the description has been made in detail with reference to the embodiment(s) thereof, it would be apparent to those skilled in the art that many modifications and variations may be made therein without departing from the spirit of the disclosure.

What is claimed is:

1. A printing device comprising:
a casing;
a circuit board provided in the casing;
an electrolytic capacitor disposed in the casing and connected to the circuit board, the electrolytic capacitor including a sleeve portion containing electrolysis liquid therein, the sleeve portion having an axis defining an axial direction, the sleeve portion including one end portion, another end portion away from the one end portion in the axial direction, and a peripheral surface extending between the one end portion and the other end portion;
an explosion-proof valve provided at the one end portion of the sleeve portion in the axial direction;
a first wall disposed in the casing and facing the explosion-proof valve in the axial direction with a space therebetween;
a second wall extending from the first wall in the axial direction, the second wall facing at least a portion of the peripheral surface of the sleeve portion with a space therebetween; and
a specific region provided in the second wall and having one of a recessed portion and a protruding portion, the recessed portion being recessed away from the peripheral surface, the protruding portion protruding toward the peripheral surface.

2. The printing device according to claim 1, wherein the first wall has a peripheral end portion defining a profile of the first wall,
wherein at least a portion of the peripheral end portion and the axis defines a first distance therebetween in a radial direction of the sleeve portion, and
wherein the peripheral surface of the sleeve portion and the axis defines a second distance therebetween in the radial direction, the first distance being greater than the second distance.

3. The printing device according to claim 1, wherein the sleeve portion has an outer diameter, and
wherein the first wall and the explosion-proof valve defines a minimum distance in the axial direction, the minimum distance being greater than zero and not more than half the outer diameter.

4. The printing device according to claim 1, wherein the first wall has a sloped portion at a side facing the explosion-proof valve, the sloped portion being inclined so as to become closer to the explosion-proof valve with increasing a distance from the axis in a radial direction, and
wherein the second wall extends from a profile end of the sloped portion in a direction from the one end portion to the other end portion.

5. The printing device according to claim 1, wherein the protruding portion of the specific region has two surfaces intersecting with each other to define a corner portion.

6. The printing device according to claim 5, wherein the specific region comprises a plurality of protruding portions extending linearly in a direction crossing the axial direction, the plurality of the protruding portions being arrayed in the axial direction with a space between neighboring protruding portions.

7. The printing device according to claim 1, wherein the circuit board extends in the axial direction and is spaced away from the sleeve portion and the first wall in a radial direction of the sleeve portion, and
wherein the second wall includes a first specific wall positioned opposite to the circuit board with respect to the sleeve portion.

8. The printing device according to claim 7, wherein the specific region is provided in the first specific wall.

9. The printing device according to claim 7, wherein the second wall further comprises a second specific wall disposed so as to extend perpendicularly relative to the first specific wall.

10. The printing device according to claim 9, wherein the specific region is provided in the first specific wall and the second specific wall.

11. The printing device according to claim 7, further comprising a third wall facing the other end portion of the sleeve portion with a space therebetween in the axial direction.

12. The printing device according to claim 1, wherein the casing comprises:
a first casing having an open end opening in a direction crossing the axial direction; and
a second casing connected to the first casing to close the open end,
wherein the first casing has a particular region adjacent to the open end, the particular region being aligned with the sleeve portion in the axial direction.

13. The printing device according to claim 1, wherein the circuit board is positioned opposite to the first wall with respect to the sleeve portion in the axial direction, and
wherein the specific region comprises a plurality of the protruding portions extending linearly in the axial direction and arrayed in a direction crossing the axial direction with a space between neighboring protruding portions.

14. The printing device according to claim 13, wherein the first wall comprises a rib protruding toward the one end portion of the sleeve portion.

15. A printing device comprising:
a casing;
a circuit board provided in the casing;
an electrolytic capacitor disposed in the casing and connected to the circuit board, the electrolytic capacitor including a sleeve portion containing electrolysis liquid therein, the sleeve portion having an axis defining an axial direction, the sleeve portion including one end portion, another end portion away from the one end portion in the axial direction, and a peripheral surface extending between the one end portion and the other end portion;
an explosion-proof valve provided at the one end portion of the sleeve portion in the axial direction;
a first wall disposed in the casing and facing the explosion-proof valve in the axial direction with a space therebetween;
a second wall extending from the first wall in the axial direction, the second wall facing at least a portion of the peripheral surface of the sleeve portion with a space therebetween; and
a specific region provided in the first wall and having one of a recessed portion and a protruding portion, the recessed portion being recessed away from the one end portion of the sleeve portion, the protruding portion protruding toward the one end portion of the sleeve portion.

16. The printing device according to claim 15, wherein the second wall comprises a pair of walls facing in a first direction perpendicular to the axial direction, wherein the first wall is formed in a plane shape perpendicular to the axial direction, the first wall extending in the first direction and a second direction perpendicular to the first direction and the axial direction, and wherein the protruding portion comprises a plurality of protruding portions extending linearly in the second direction, the plurality of protruding portions being arrayed in the first direction with a space between neighboring protruding portions.

17. The printing device according to claim 15, wherein the first wall has a peripheral end portion defining a profile of the first wall, wherein at least a portion of the peripheral end portion and the axis defines a first distance therebetween in a radial direction of the sleeve portion, and wherein the peripheral surface of the sleeve portion and the axis defines a second distance therebetween in the radial direction, the first distance being greater than the second distance.

18. The printing device according to claim 15, wherein the sleeve portion has an outer diameter, and wherein the first wall and the explosion-proof valve defines a minimum distance in the axial direction, the minimum distance being greater than zero and not more than half the outer diameter.

19. The printing device according to claim 15, wherein the first wall has a sloped portion at a side facing the explosion-proof valve, the sloped portion being inclined so as to become closer to the explosion-proof valve with increasing a distance from the axis in a radial direction, and wherein the second wall extends from a profile end of the sloped portion in a direction from the one end portion to the other end portion.

* * * * *